Figure 1:
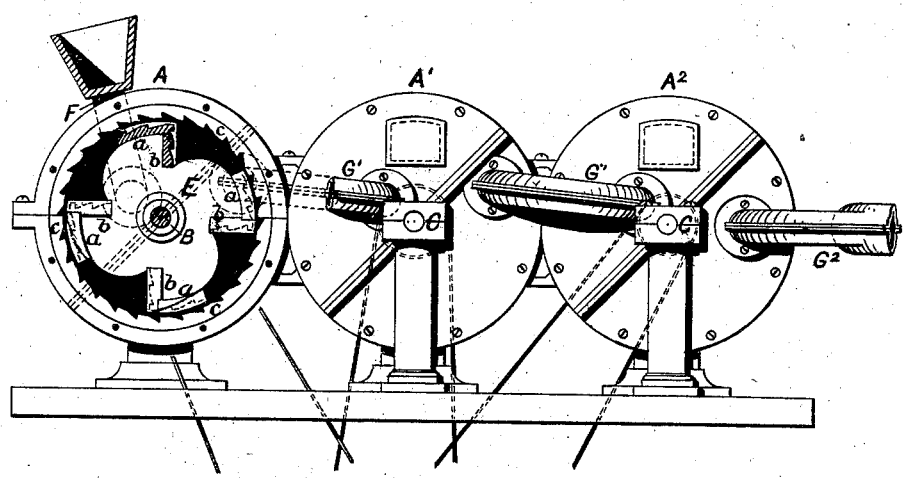

VAN B. RYERSON
APPARATUS FOR REDUCING CEREALS INTO FLOUR.

No. 189,959.  Patented April 24, 1877.

3 Sheets—Sheet 1.

WITNESSES.
George E. Danielson.
Edson S. Jones.

INVENTOR.
Van Buren Ryerson.

3 Sheets—Sheet 2.

VAN B. RYERSON
APPARATUS FOR REDUCING CEREALS INTO FLOUR.

No. 189,959. Patented April 24, 1877.

WITNESSES:
George E. Danielson.
Edson S. Jones.

INVENTOR:
Van Buren Ryerson

3 Sheets—Sheet 3.

VAN B. RYERSON
APPARATUS FOR REDUCING CEREALS INTO FLOUR.

No. 189,959. Patented April 24, 1877.

UNITED STATES PATENT OFFICE.

VAN BUREN RYERSON, OF NEW YORK, N. Y.

IMPROVEMENT IN APPARATUS FOR REDUCING CEREALS INTO FLOUR.

Specification forming part of Letters Patent No. 189,959, dated April 24, 1877; application filed June 6, 1876.

*To all whom it may concern:*

Be it known that I, VAN BUREN RYERSON, of the city, county, and State of New York, have invented certain new and useful Improvements in Machinery for Reducing Cereals into Flour, and other substances into powder, of which the following is a specification:

My machinery, when applied, for example, to the reduction of grain into flour, involves a novel mode of operation, which is distinguishable from all previously known processes or methods in this, that it does not consist mainly in crushing the kernels between revolving grinding-surfaces, or pulverizing them by causing them to impinge with great violence upon or against a resisting-surface, or reducing them to powder by the process of percussion. While some one or all of these processes may be, and probably are incidentally, partially involved in the operation of my machinery, its operative value consists, essentially, in causing the kernels to be rubbed upon each other as the result of a rotary movement induced by a succession of eddies or reactionary air-currents in opposition to the direction in which the grains or particles of grain are at high velocity moving, whereby each kernel or particle of matter composing it, having a rotary motion on its own axis given to it, at the same time that it has a motion around a fixed center, is rubbed upon or against other kernels or particles of matter having a similar motion, and thereby each layer of matter composing the kernels of grain, from the outer integument to the core, is successively unrolled, and not crushed, torn, or broken, as is the result of all previous processes of milling, which necessarily involve the tearing of the grain by grinding, the bursting of it by impact, or pulverizing it by percussion, such results being essentially due to the operation of all mechanism heretofore employed in the art of milling.

I have exhibited in the drawings forming a part of this specification the machinery which I have successfully employed.

A $A^1$ $A^2$ represent a series of circular metallic cases, each about three feet in interior diameter, all connected together by suitable pipes of communication, as hereinafter explained, and each suitably supported by a pedestal-base upon a common bed-plate. The interior arrangement and construction of the several cases is the same, and a description of one is a description of all.

Figure 2:
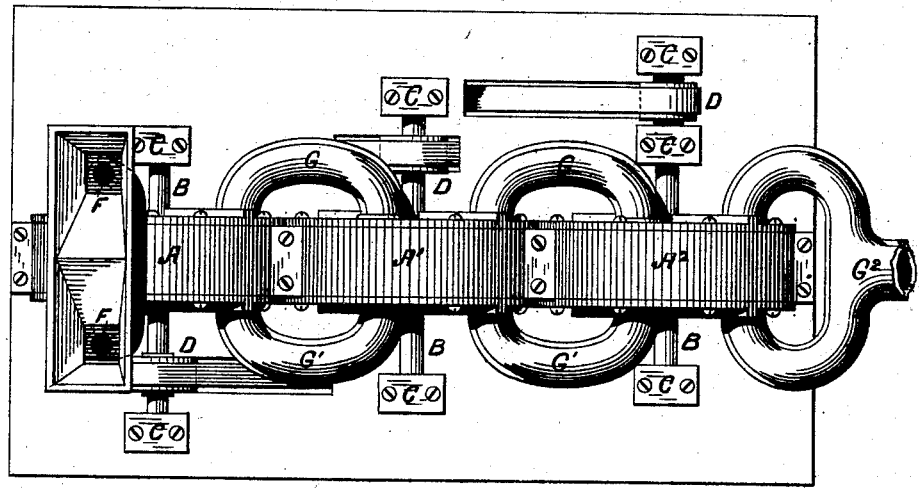

B represents a shaft, which extends through the central axis of the vertical side plates of each case, and is mounted in suitable journal-bearings C, surmounting supporting columns or standards. As each shaft requires a driving-pulley, D, which must be located so that the driving-belt will not interfere with any other one, the standards for supporting the bearings for the shafts may be located as shown in the top or plan view, Fig. 2, or in any other preferred way which will enable the driving-power to be most conveniently applied to each of the shafts.

Figure 3:
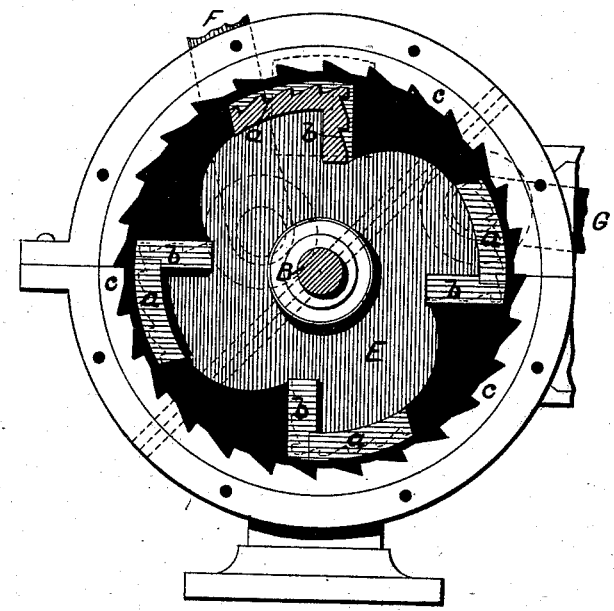

Each shaft B carries a disk, E, set in a vertical plane midway between the two walls of the case to which it belongs. The outline of this disk is shown at Figs. 1 and 3, and is of a figure which results from cutting the disk on four radial lines, equidistant from each other, to the depth of five inches, more or less, from the edge toward the center, and then removing segments of the disk, commencing at a point ten to twelve inches, more or less, measured on the periphery, and extending on a curved line to the bottom of the next preceding radial cut. This gives to the disks the "spider" form shown in the drawings.

Figure 4:
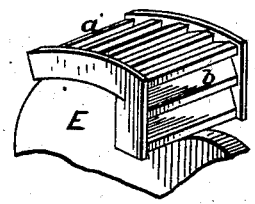

The portions of the disk which are concentric with the inner periphery of the case are provided with sections of a rim or web, *a a a a*, Figs. 1, 3, and 4, of a width, with suitable allowance for clearance, equal to the distance between the sides of the case. The surface of these sections of rim, except at the sides, (which are left of full thickness for a distance of an inch or more,) is "dressed" with a series of notches, as shown at Figs. 1, 3, 4, and 5. The object of not having the ratchet-like surface extend from side to side is to prevent the grain, as it is being reduced to flour, from being thrown against the sides of the case, and thus the sections of rim *a* are provided with side pieces to stop off the channels which would otherwise be formed by the dressing, as seen in perspective at Fig. 4.

The edges of the radial cuts in the disk-plates E are furnished with beaters *b b b b*, which are of the same width as the sections of rim *a*, and may have their faces similarly dressed.

Figure 5:
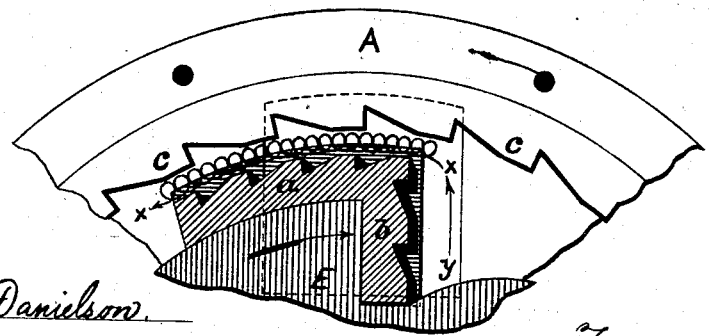

The inner periphery of each case is provided with a stationary ring of steel, *c*, whose width is equal to the distance between the sides of the case, and whose surface is ratchet-dressed, as shown at Figs. 1, 3, and 5. It will be observed, however, that the angle of the dressing is the reverse of that which belongs to the dressing on the sections of rim *a a a a*, so that the disk-plate, in revolving, always moves in a direction away from the radial faces of the dressing-scores in the ring *c*.

It is now to be understood that the cereal to be reduced to flour is to be supplied to the first mill in the series from a suitable source of supply, in quantity to be regulated by the capacity of the apparatus and the judgment of the miller. The grain is introduced on both sides of the disk E at the same time, through pipes F, at a point near the center of the disk, and it is also to be understood that the several mills composing the series are in communication with each other by means of pipes G G', leading from one to the other from both sides, as shown clearly at Figs. 1 and 2.

The operation of the apparatus is as follows: Each one of the disks E in the series is made to revolve within its case at a very high degree of velocity, and at a rate progressively increasing throughout the series. I have found that the first disk should be revolved at the rate of from about seventeen hundred to two thousand revolutions per minute, the second disk at the rate of from about two thousand to twenty-five hundred per minute, and the third disk at the rate of from about twenty-five hundred to three thousand per minute. If any additional number of mills compose the series, the speed of rotation of such additional mills should be increased in about the same proportion.

The effect of the rotation of the first disk in the series is to drive the air in front of the beaters *b b b b*, at the same ratio of speed at which the disk revolves. Between the dressed faces of the sections of rim *a a a a* and the dressed surface of the stationary ring *c* there is a broken annular space, varying from half an inch to an inch and a half in thickness, and in width equal to the distance between the sides of the case.

The rapid rotation of the beaters *b b*, causing a rotation of the central body of air in the case, produces a reactionary effect upon the belt of air lying between the path of revolution of the sections of rim *a a* and the broken surface of the ring *c*. This belt of air, if it were not confined by the circular rim of the case, would be moved at high velocity in tangential lines in a direction the reverse of that in which the disk is revolving; but being confined by the circular rim it is made to revolve circularly in such direction, the reverse of the direction in which the beaters revolve. The importance of the dressing on the inner surface of the ring *c* will now be understood. It is not for the purpose of performing the function which is performed by the dressing on the stones of a grinding-mill, but its purpose is to present a succession of surfaces radial, or nearly so, to the circle in which the belt of air revolves, against which the current of air impinging shall be broken up into eddies or whirlpools, which, while severally revolving on their own axes, have also a path of revolution or planetary movement around a common center. This is illustrated at *x x*, Fig. 5.

The grain to be reduced to flour, so soon as it enters the mill A, flies outward toward the periphery of the case, moving in the direction of the arrow *y*, Fig. 5. Here it is taken up by the revolving belt of whirling air-eddies *x x*, and each grain or particle of matter composing it is rotated violently on its own axis, and thereby its exterior surface is rubbed against the surfaces of other grains and particles, and by the attrition of the grains or particles of matter upon each other the substance of the kernel is reduced to flour.

The sections of rim *a* are from two to twelve inches, more or less, in length, and are concentric with the interior periphery of the case. It is important that these sections should be as long as possible, and except that it is indispensable that space for the passage of the grain outward from the center toward the periphery of the case should exist, it would be well to have the peripheral rim of the disk E continuous instead of broken into sections; and this feature of construction of the disk distinguishes the revolving disk which I employ from the revolving disks employed in mills heretofore known for reducing rock and ores, inasmuch as the grain, during the process of reduction to flour, is practically upheld by the sections of rim *a*, and kept within the influence of the revolving eddying air-current above mentioned.

The pressure of the air within the case A, induced by the rotation of the disk E, causes the material which has been operated on by the first mill or member in the series to be conveyed, through the discharge-pipes G G$^1$ into the next mill in the series, and from this it is conveyed into the next mill, and so on throughout the series; the material being operated upon by each successive mill in the same manner as by the first one in the series, with the exception that the velocity at which the disk revolves in each succeeding mill exceeds considerably the velocity with which the disk of the next preceding mill revolves, and consequently the grain which is in process of reduction into flour is, by the combined force of pressure from the one member of the series, and suction from the next member, delivered to each progressively throughout the series under an increased pressure.

While I have found that the ring *c*, having a ratchet-formed inner periphery formed into a succession of radial surfaces, as above described, accomplishes the result of creating (when the disk is revolving) a great number of whirls or eddies, I know that the same result can be produced by causing air to be forced into the case in jets through a succession of openings entering the circular rim of the mill radially, so as to break up the continuity of the revolving belt of air between the inner periphery of the circular rim and the revolving disk, and this arrangement would be a modification of the mechanical means for employing my process.

I have described my machinery with especial reference to the conversion of cereals into flour. It is evident, however, that the same machinery may, without substantial change, be employed for reducing into powder various other substances and materials.

Figure 6:
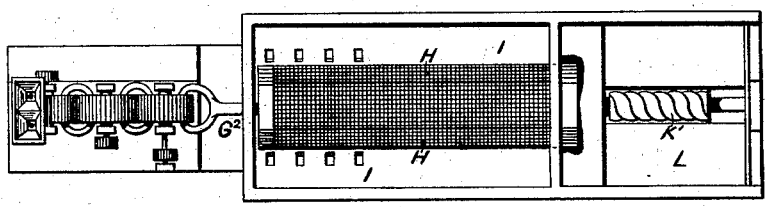
Figure 7:
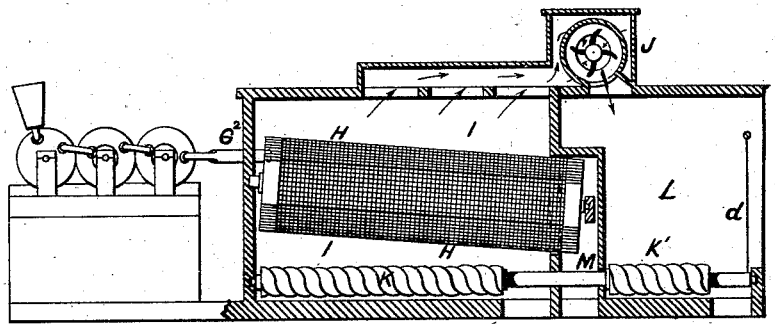
Figure 8:
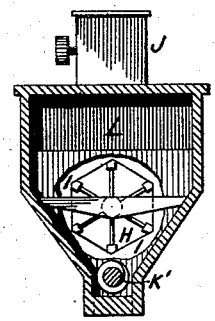

By my machinery described I have been enabled to convert wheat into flour with a set of three of these mills, such as described, at the rate of sixty to ninety bushels per hour, and as the flour, when it is discharged from the last mill in the series, is perfectly cold, (thereby demonstrating that the operations of percussion or impingement which develop heat have not in any material degree been involved,) I am enabled to discharge the flour while under pressure directly into an apparatus for bolting it. An arrangement for this purpose is shown at Figs. 6, 7, and 8 of the drawings, in which the flour is, under a very high degree of pressure, thrown through the discharge-pipe $G^2$ into the bolt H. The air, after it enters the bolt, expands and drives the flour through the meshes of the bolt into the chamber I, and from thence, by the aid of a suction-fan, J, the air is drawn out of the chamber I and into the supplementary chamber L, and finally blows out past the end curtain $d$. The specific gravity of the flour being greater than that of the air in the chamber I, the flour falls down upon an endless conveyer, K, by which it is carried away and discharged in the usual way, and if any flour is carried over into the chamber L it will, in like manner, fall and be collected and discharged by the conveyer K'. The bran is also discharged from the bolt at M, and collected as in other flouring-mills. An examination of the bran as it comes from the bolt will show that the outer covering of the kernel of wheat or other grain has been stripped off and rolled up into a pellet.

Having thus described my invention, and the means for carrying it into effect, what I claim as my invention is—

1. In a machine for reducing cereals into flour, or other substances into powder, substantially as described, the combination of a circular case, the interior periphery of which is provided with a succession of abrupt faces, as described, with a revolving disk having radial beaters, and provided with sections of rims, having also a succession of abrupt faces, as described.

2. The combination, with the circular case of a milling-machine, as described, of a revolving disk having radial beaters, as described, and provided with sections of a rim, as described.

3. The combination of machinery, substantially as described, for reducing cereals to flour, substantially as described, with suitable machinery, as described, for bolting flour, whereby the flour is discharged from the mill under blast-pressure directly into the bolt, substantially as specified.

VAN BUREN RYERSON.

Witnesses:
THOMAS F. COSGROVE,
J. C. B. WOODS.